Figure 1:
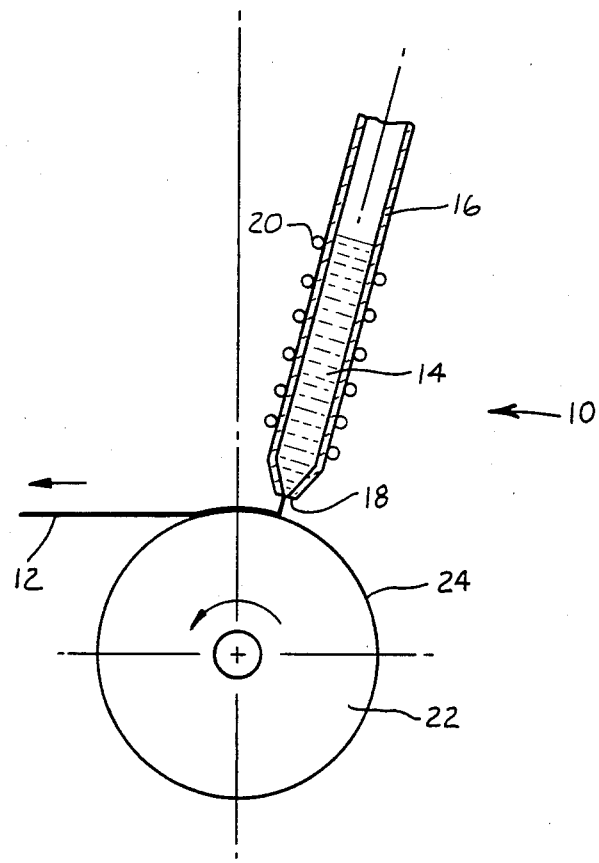

United States Patent [19]

Pryor et al.

[11] Patent Number: 4,648,437
[45] Date of Patent: Mar. 10, 1987

[54] METHOD FOR PRODUCING A METAL ALLOY STRIP

[75] Inventors: Michael J. Pryor, Woodbridge, Conn.; Michael L. Santella, Knoxville, Tenn.

[73] Assignee: Olin Corporation, New Haven, Conn.

[21] Appl. No.: 809,664

[22] Filed: Dec. 16, 1985

Related U.S. Application Data

[60] Division of Ser. No. 570,123, Jan. 12, 1984, which is a continuation-in-part of Ser. No. 499,008, May 27, 1983, abandoned.

[51] Int. Cl.⁴ .............................................. B22D 11/00
[52] U.S. Cl. .................................... 164/463; 164/476; 164/477
[58] Field of Search ................. 164/463, 462, 476, 477

[56] References Cited

U.S. PATENT DOCUMENTS

| | | |
|---|---|---|
| 2,754,193 | 7/1956 | Graham et al. . |
| 2,754,194 | 7/1956 | Graham et al. . |
| 2,967,794 | 1/1961 | Coxe ........................ 428/606 |
| 3,073,728 | 1/1963 | Falk ..................... 148/31.55 |
| 3,186,707 | 6/1965 | Banning, Jr. et al. . |
| 3,265,472 | 8/1966 | Nessle et al. ................ 428/928 |
| 3,432,279 | 3/1969 | Mendelsohn et al. ......... 428/928 |
| 3,583,864 | 6/1971 | Adler . |
| 3,838,982 | 10/1974 | Sanderow et al. ........... 428/546 |
| 3,940,262 | 2/1976 | Niebyski et al. ............ 428/611 |
| 4,221,257 | 9/1980 | Narasimhan . |
| 4,257,830 | 3/1981 | Tsuya et al. . |
| 4,330,027 | 5/1982 | Narasimhan . |

FOREIGN PATENT DOCUMENTS 76618 4/1983 European Pat. Off. ............ 164/462

Primary Examiner—Kuang Y. Lin
Attorney, Agent, or Firm—Howard M. Cohn; Barry L. Kelmachter; Paul Weinstein

[57] ABSTRACT

A method for producing a metallic strip is disclosed. A metallic melt containing above about 20% by weight of iron is formed into a strip so that fine iron particles are distributed throughout. The strip may be rolled to elongate the iron particles.

16 Claims, 2 Drawing Figures

METHOD FOR PRODUCING A METAL ALLOY STRIP

This application is a division, of application Ser. No. 570,123, filed Jan. 12, 1984 which is a continuation-in-part of U.S. Ser. No. 499,008, filed May 27, 1983, now abandoned.

While the invention is subject to a wide range of applications, it especially relates to the formation of a thin continuous metallic strip having equiaxed or oriented ferromagnetic particles distributed throughout. More particularly, the metallic strips are suitable for a magnetic tape medium or as an intermediate material for making iron or iron alloy particles.

In the past, improvements in magnetic tape performance were largely focused in two areas. Firstly, improvements in the remanence and coercivity of the magnetic particles were achieved by factors such as doping and optimizing particle size, morphology and purity. Secondly, improved distribution and alignment of particles which improve the remanent induction and coercivity were achieved by various process controls. However, performance limitations remain due to agglomeration of ferromagnetic particles and a lack of particle orientation in the longitudinal direction.

Thin ribbons of magnetic material have been manufactured using a chill surface similar to that described in the present invention. For example, U.S. Pat. No. 4,257,830 to Tsuya et al. discloses "a thin ribbon of magnetic material having a high permeability, excellent flexibility and workability, and consisting essentially of by weight 4–7% of aluminum, 8–11% of silicon and the remainder substantially iron and inevitable impurities and having a compact fine grain crystalline structure without existing substantially an ordered lattice." Although the disclosed thin strip forming technique includes steps similar to that of the present invention, the formed material is completely different. U.S. Pat. Nos. 4,330,027 and 4,221,257 also disclose the method of making continuous metallic amorphous strips using a chill body.

Magnetizable tape of a thin sheet of highly magnetizable alloy and provided with a thin backing of high tensile, flexible, substantially non-stretchable material is disclosed in U.S. Pat. No. 3,186,707. However, this patent does not suggest or teach forming a metallic strip similar to that of the present invention.

In particular, the present invention relates to a magnetizable strip which is primarily fabricated from iron and a matrix of metal or metal alloy. There is considerable art describing the melting and casting of high compositions of iron and a metal or alloy such as copper disclosed in U.S. Pat. Nos. 2,754,193, 2,754,194 and 3,583,864. However, none of these patents suggest processing the copper-iron mixture to provide the magnetic properties inherent in the present invention.

It is a problem underlying the present invention to provide a method for producing a metallic strip having equiaxed or accicular ferromagnetic particles which are not agglomerated and which may be homogeneously distributed throughout the strip.

It is an advantage of the present invention to provide a method for producing a metal or alloy strip which obviates one or more of the limitations and disadvantages of the described prior arrangements.

It is a further advantage of the present invention to provide a method for producing a metal or alloy strip having homogeneously distributed ferromagnetic particles through the strip.

It is another advantage of the present invention to provide a method for producing a metal or alloy strip suitable for use as a magnetic medium or as an intermediate material for making equiaxed or accicular iron particles.

It is a still further advantage of the present invention to provide a method for producing a metal or alloy strip containing copper and iron which is relatively inexpensive to manufacture.

Accordingly, there has been provided a method for producing a strip useful as a magnetic recording medium or an intermediate material for making iron particles. A melt of molten metal or metal alloy containing above about 20% by weight of iron is solidified so that equiaxed iron or iron alloy particles, between about 0.05 to about 0.5 microns in diameter, are distributed substantially homogeneously throughout the solidified base metal matrix. The solidified mixture may be cold rolled into a thin strip so that the iron particles together with the matrix elongate.

Figure 2:
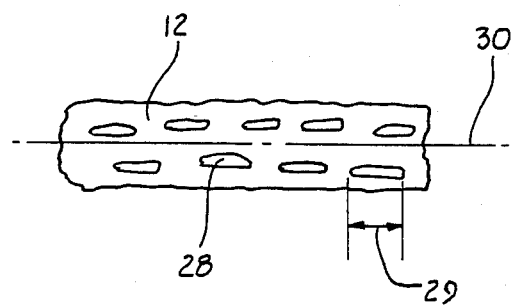

The invention and further developments of the invention are now elucidated by means of preferred embodiments shown in the drawings:

FIG. 1 is a diagrammatical view of an apparatus for manufacturing a thin strip of magnetic material in accordance with the present invention; and FIG. 2 is a highly magnified view of a section of the manufactured strip.

The present invention relates to a method for producing a magnetic recording medium or intermediate material for making iron particles. First, a metal or alloy is melted by any conventional means. The base metal preferably comprises copper or copper alloy. However, it is within the scope of the present invention to add other constituents such as the transition metals described hereinbelow. Iron may be mixed into the molten base metal to form a substantially homogeneous single phase melt of the two metals. Although the iron may comprise above about 20% by weight of the entire mixture, the iron is preferably about 20 to about 60% by weight of the mixture and most preferably between about 30 to 50% by weight of the mixture. The iron is preferably substantially pure although it may contain some impurities or doping elements.

Although the invention is primarily described using only copper and iron, it is also within the scope of the present invention to add some other desired components to the melt to effect the operating parameters of the metallic strip if it is used as a magnetic recording medium. Transition metal additions that enhance the magnetic performance of the iron particles may be incorporated by alloying the melt. Nickel, cobalt, manganese and other transition elements in an effective amount up to weight percents of about 10% maximum and preferably between about 2 to about 7% are advantageous for this purpose and are within the scope of conventional alloying techniques. Other metal additions that primarily partition to the copper or copper alloy to enhance the performance of the strip may also be incorporated into the melt.

The metal or alloy strip can be conveniently manufactured with an apparatus as shown in FIG. 1. There, an apparatus 10 is illustrated for producing a continuous long thin strip 12 of copper or copper alloy dispersed with iron. The mixture of molten copper base metal and iron 14 may be introduced into a heat resisting tube 16 which may be composed of quartz. The tube 16 is provided with a nozzle 18 having a diameter of about 0.3 to about 1.5 mm at one end. The molten material 14 is preferably maintained at any desired temperature slightly above the liquidus point of the melt by any suitable means such as a heat resistor 20. Notwithstanding the above temperature limitations, the molten material may be maintained at any desired temperature. Although the temperature may be not more than about 200° C. above the liquidus, it is preferably not more than about 100° C. above the liquidus. A cooling substrate 22, such as a chill wheel, is rotatably arranged below the heat resisting tube 16. The chill wheel may be of any desired diameter and may be rotated with a peripheral speed of between approximately 1,050 to 8,400 feet per minute (fpm) and preferably between about 2,100 to 4,200 fpm. However, it is within the scope of the present invention to rotate the wheel at any desired speed. The open end 18 of the nozzle is preferably positioned less than about 5 mm and preferably less than about 2 mm from the smooth surface 24 of the wheel 22. The molten material is ejected from the tube 16 on to the rotating surface 24 under a pressure of between about 5 to about 40 psi and preferably between about 15 to about 25 psi applied to the melt 14. As soon as the molten material contacts the rotating surface 24, the melt quickly cools and solidifies into a thin continuous strip 12 having the iron or iron alloy particles distributed substantially homogeneously or isotropically throughout the copper base metal matrix.

There are two precipitation modes of iron from a rapidly solidified copper-iron melt. The primary solidification tends to be relatively coarse and plate like. These particles have a size greater than approximately $2\mu$. The secondary solidification which occurs at the terminal stage of solidification is much finer and more equiaxed. The substantially equiaxed particles may be spherical or cubical in morphology and have a size in the range of about $0.05\mu$ to about $0.5\mu$. The equiaxed particles make up the majority of the iron particles in the primarily copper matrix.

The thickness and width of the obtained thin strip 12 can be determined by a number of factors. For example, the surface tension between the molten material and the surface 24 of the moving chill wheel 22 affects the shape of strip 12. As the surface tension of the melt increases relative to the wheel, the strip tends to be thicker and narrower. An increase in the rotational speed of the chill wheel forms a thinner, wider strip. The ejection pressure of the melt 14 also acts to shape the strip. As the pressure increases, the width of the strip increases while its thickness decreases. The diameter of the nozzle being between about 0.3 to about 1.5 mm and preferably between about 0.8 to about 1.2 mm is a factor. The smaller the diameter of the nozzle, the thinner and more narrow the strip. Of course, the ejection temperature and viscosity of the melt are also critical factors. The hotter and less viscous the melt, the thinner and wider the strip. The viscosity is thought to be in the range of about 0.01 to about 1 poise.

The selection of the material forming the chill wheel must take into account the wettability between the molten thin strip and the surface 24. This wettability is mainly determined by surface tensions of the melt and the substrate. It has been found that a chill wheel formed of copper can be successfully used to manufacture strip of the materials set forth hereinabove. However, it is also within the terms of the present invention to use other materials such as for example, copper alloy, aluminum, aluminum alloy, steel, steel alloy or graphite.

The temperature of the molten material or melt is preferably slightly above its liquidus point. As mentioned above, although the temperature may be not more than about 200° C. above the liquidus point, it is preferably not more than about 100° C. above the liquidus point. If the temperature were below the liquidus point, the mixture would contain some solid particles and would not form properly. Conversely, if the temperature were too high above the melting point, the melt might either spread over the cooling surface of the chill wheel so that the strip becomes too thin or spray off the wheel before solidifying into a strip. Accordingly, the preferred temperature is slightly above the liquidus point so that the chill wheel can extract enough heat to immediately make the strip slightly solid and give it some mechanical stability or strength. Depending upon the particular composition of the melt and other operating parameters of the process, the cooling rate might be about $10^2$ to $10^{8°}$ K. per second and preferably between about $10^2$ to about $10^{6°}$ K. per second.

Although a chill wheel is described as the preferred apparatus for forming the strip, it is also within the terms of the present invention to form the strip by any desired conventional means.

The present invention is primarily concerned with the formation of strip that is useful as a magnetic recording medium or as an intermediate material to produce iron or iron alloy particles. The process of forming the strip is controlled so that the majority of these ferromagnetic particles are homogeneously distributed throughout the strip of non-magnetic metal matrix, equiaxed, i.e. spherical or cubical in shape, and preferably sized so that each particle is a single magnetic domain, i.e. in the range of about 0.05 to about 0.5 microns in thickness. The particle size is determined by solid solidification time which in turn is determined by factors such as the casting rate, thickness of the casting and the thermal conductivity of the alloy. Thicker casting sections produce larger particles while thinner casting sections produce smaller particles. In general, a faster cooling rate results in the formation of smaller particles.

A typical example is a melt of molten copper containing about 30% by weight of iron. The molten stream is ejected onto the chill wheel by a gas pressure of about 15 to 25 psi. The nozzle is located about 1 mm from the surface of the chill wheel. The chill wheel is made of copper and rotates at about 3,150 fpm. The resulting strip is about 2 to 3 mm in width and has a thickness of about 0.05 mm. The iron particles are isotropically or homogeneously dispersed throughout the copper matrix with a majority being substantially equiaxed and having a diameter or thickness of about 0.1 micron or less.

The final copper or copper alloy strip, in accordance with the present invention, may provide acicular ferromagnetic particles, i.e. iron, both isotropically or homogeneously dispersed throughout the matrix and with a high level or orientation in the longitudinal direction. So far, the process described has formed ferromagnetic particles being substantially equiaxed, i.e. spherical or cubical in shape and homogeneously or isotropically spaced throughout the matrix. The next step is directed to elongating the particles and orienting them in the longitudinal direction. To accomplish this, the cast strip is preferably cold rolled to obtain the desired aspect ratio and orientation of the particles as well as the final thickness of the strip. The aspect ratio of the new wrought particles, i.e. the ratio of the length to width, is preferably between about 5:1 and about 7:1 although it may be in the range of about 4:1 to about 15:1. As the solidified melt is rolled into a thin strip, the iron or iron alloy particles 28, as shown in FIG. 2, elongate with their longitudinal dimension 29 in substantial alignment with the direction of rolling or the longitudinal axis 30 extending through the strip 12. The transverse section of smallest dimension of the wrought ferrous particles, between about 0.05 to about 0.5 microns, is preferably substantially perpendicular to the axis 30.

Due to the step of cold rolling, the strip may be very stiff and difficult to wrap around spools or to use as required. It, therefore, may be desirable to anneal the strip and soften it as required. To soften the wrought iron particles, the annealing would require temperatures in the range of about 400° to about 900° C. The strip can be annealed in this range without changing particle morphology.

Once the strip with either the equiaxed or accicular particles is formed, it may be desirable to plate it with a protective material such as a smooth electrode copper deposit. The plating preferably has a thickness of about 100 to about 500 microinches and preferably between about 200 to about 300 microinches. The plating may be applied by any desired technique such as conventional electrochemical plating.

The tape, whether plated or not, requires protection from tarnishing and corrosion. This may be accomplished by passing the tape through stain inhibitors such as benzotriazole or tolutriazole. These stain inhibitors also improve the lubricity of the strip to decrease the wear when used against a device such as a tape head. Other materials which provide the properties of tarnish and corrosion resistance as well as lubricity include copper fatty acid layers.

The patents set forth in this application are intended to be incorporated by reference herein.

It is apparent that there has been provided in accordance with this invention a method for producing a metal alloy strip having substantially equiaxed or accicular iron or iron alloy particles distributed throughout which satisfies the objects, means, and advantages set forth hereinabove. While the invention has been described in combination with the embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method for producing a metal alloy strip, comprising the steps of:
    (a) providing a melt of metal alloy consisting essentially of about 20 to 60% by weight of iron and the balance being a material selected from the group consisting of copper and alloys thereof, said material forming a matrix; and
    (b) rapidly solidifying said melt into said metallic strip having substantially fine, equiaxed particles of iron or iron alloy distributes substantially homogenously throughout said matrix, said equixed particles having a width between about 0.05 to about 0.5 microns.

2. The method of claim 1 wherein said step of providing a melt further includes the step of maintaining said melt at a temperature of not more than about 100° C. above the liquidus point of the melt.

3. The method of claim 1 wherein said step of providing a melt further includes the step of providing an additional metal in the melt which partitions to the copper or copper alloy.

4. The method of claim 1 wherein said step of providing a melt further includes the step of providing transition metal additions in said melt to enhance the magnetic performance of the iron alloy particles.

5. The method of claim 3 wherein said step of providing a melt further includes the step of providing transition metal additions in said melt to enhance the magnetic performance of the iron alloy particles.

6. The method of claim 1 wherein said step of solidifying said strip includes the step of cooling said melt at a rate whereby the majority of said iron or iron alloy particles are in a size range of about 0.05 to about 0.5 microns.

7. The method of claim 6 wherein said step of cooling said melt occurs at a rate of about $10^2$ to about $10^{8°}$ K./sec.

8. The method of claim 1 further including the step of rolling said strip to elongate the iron or iron alloy particles.

9. The method of claim 8 wherein said step of rolling said strip includes forming said iron or iron alloy particles with an aspect ratio of between about 4:1 to about 15:1.

10. The method of claim 9 wherein said step of rolling said strip includes forming said iron or iron alloy particles with as aspect ratio of between about 5:1 to about 7:1.

11. The method of claim 7 wherein said step of solidifying said strip includes the step of depositing said melt on a chill surface to form a continuous strip.

12. The method of claim 8 further including the step of annealing the rolled strip at a temperature in the range of about 200° to 900° C.

13. The method of claim 8 wherein the step of rolling said strip aligns a longitudinal axis of the elongated particles substantially with a longitudinal axis of said strip.

14. The method of claim 1 further including the step of plating said strip with a protective coating.

15. The method of claim 14 further including the step of providing said protective coating from primarily copper.

16. The method of claim 15 further including the step of coating said protective coating with a stain inhibitor to prevent tarnishing, corrosion, and improve lubricity.

* * * * *